United States Patent [19]
Inoue et al.

[11] 3,870,792
[45] Mar. 11, 1975

[54] CERTAIN DIHYDROPHTHALIZINES FOR TREATING HEMORRHAGE AND THROMBOSIS

[76] Inventors: Michiro Inoue, 26-3, 6-chome, Kokuryo-cho, Tokyo; Masayuki Ishikawa, 14-13, 3-chome, Akazutsumi, Setagaya-ku, Tokyo; Takashi Tsuchiya, 13, Kitamachi, Shinjuku-ku, Tokyo; Takio Shimamoto, 17-25, 5-chome, Minamikoiwa, Edogawa-ku, Tokyo, all of Japan

[22] Filed: Aug. 10, 1973

[21] Appl. No.: 387,297

Related U.S. Application Data
[62] Division of Ser. No. 274,512, July 24, 1972, Pat. No. 3,840,662.

[52] U.S. Cl. ............................ 424/250, 260/250 P
[51] Int. Cl. ........................................ A61k 27/00
[58] Field of Search .................................... 424/250

[56] References Cited
OTHER PUBLICATIONS
Annual Report of Dept. of Pharm., Kanazawa Univ., Japan, Vol. 12 (1961), pp. 1–6.

*Primary Examiner*—Vincent D. Turner
*Attorney, Agent, or Firm*—Sherman & Shalloway

[57] ABSTRACT

Pharmaceutical composition comprising an effective amount of a compound of the following formula

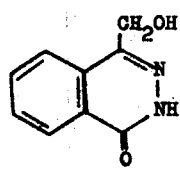

or a pharmaceutically acceptable acid salt thereof, and diluent; method of treating hermorrhage, thrombosis and atherosclerosis by using said composition; and process for production of a compound of said formula.

2 Claims, No Drawings

CERTAIN DIHYDROPHTHALIZINES FOR TREATING HEMORRHAGE AND THROMBOSIS

This is a division of application Ser. No. 274,512 filed July 24, 1972 now U.S. Pat. No. 3,840,662.

This invention relates to a novel process for producing known 4-hydroxymethyl-1-keto-1,2-dihydrophthalazine, a process for producing acid salts thereof, a pharmaceutical composition containing said dihydrophthalazine or pharmaceutically acceptable acid salts thereof, and to a method of treating hemorrhage, thrombosis or atherosclerosis.

The 4-hydroxymethyl-1-keto-1,2-dihydrophthalazine expressed by the following formula (I)

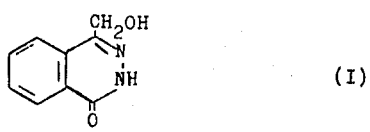

is a known compound having a melting point of 204°C. [Annual Report of Department of Pharmacy, Kanazawa University, Japan, Vol. 12, 1–6 (1961)]. It has not however, been known at all that this compound has pharmaceutical effects. The above-mentioned report states that the compound of formula (I) was obtained by brominating o-acetylbenzoic acid, hydrolyzing the product with an acid, and reacting the hydrolyzate with hydrazine, in accordance with the method disclosed in Ber. 40, 72 (1907).

This report does not disclose anything about the pharmaceutical effects of the compound obtained nor its possible utility. Furthermore, it states that the compound of formula (I) was obtained in a very low yield of several percent to 10 percent by this disadvantageous operation requiring many steps.

It has not been found by the inventors of this specification that the compound of formula (I) is a substance having pharmaceutical effects, especially for the treatment (including the prevention of hemorrhage, thrombosis and atherosclerosis and also having low toxicity (for example, $LD_{50}$ more than 4,500 mg/Kg mouse).

Further study has led to the discovery that the compound of formula (I) can be easily produced in a high yield above 90 percent by simply reacting a compound of formula (II) below

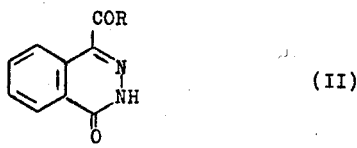

wherein R is an alkoxy group having 1 to 5 carbon atoms or a halogen atom, with an alkali metal borohydride in a solvent, and that the compound of formula (I) forms unknown addition salts with organic or inorganic acids, which addition salts exhibit pharmaceutical effects, which are the same as, or superior to, those of the compound of formula (I).

It is known that generally lithium aluminum hydride is used in order to obtain a primary alcohol by reducing a carboxylic acid ester, and the reaction does not proceed essentially with sodium borohydride [Angew. Chem., 73,81(1961); H. C. Brown "Hydroboration" 242(1963)]. It is also well known that when a nitrogen-containing heterocyclic compound, especially a diazine compound such as phthalazine or quinoxaline is treated with lithium aluminum hydride, the nitrogen-containing hetero ring is easily reduced ["Jikken Kagaku Koza" 8c (or Lectures on Experimental Chemistry), Vol. 17, page 61].

Surprisingly, we have found contrary to the expectation from the above-mentioned prior knowledge that by the reaction of the compound of formula (II) with an alkali metal borohydride, the compound of formula (I) can be formed in high yield.

According to the present invention, therefore, the compund of formula (I) can be obtained in high yield from an inexpensive material by a simple reaction operation in which the reaction steps are very much shortened.

Accordingly, a primary object of this invention is to provide a novel pharmaceutical composition which is useful especially for treating hemorrhage, thrombosis and atherosclerosis.

A second object of this invention is to provide an advantageous process for producing the compound of formula (I) having the above-mentioned pharmaceutical effects.

A third object of this invention is to provide a method of treating hemorrhage, thrombosis and atherosclerosis utilizing the pharmaceutical effects that have been newly discovered.

Many other objects of this invention along with its advantages will become more apparent from the following description.

The compounds of formula (II) used in this invention can be easily obtained by a known method. For example, it can be easily produced, in accordance with the method disclosed at page 1316, Vol. 68, Journal of the American Chemical Society, by oxidizing naphthalene with potassium permanganate, reacting the oxidized product with hydrazine, and esterifying the resultant 4-carboxy-1-keto-1,2-dihydrophthalazine in a customary manner or treating it with thionyl chloride to convert it to the acid chloride.

Examples of compounds according to formula (II) include 4-methoxycarbonyl-1-keto-1,2-dihydrophthalazine, 4-ethoxycarbonyl-1-keto-1,2-dihydrophthalazine, 4-propoxycarbonyl-1-keto-1,2-dihydrophthalazine, 4-butoxycarbonyl-1-keto-1,2-dihydrophthalazine, 4-amyloxycarbonyl-1-keto-1,2-dihydrophthalazine, 4-chlorocarbonyl-1-keto-1,2-dihydrophthalazine, and 4-bromocarbonyl-1-keto-1,2-dihydrophthalazine.

As the alkali metal borohydride, there can be used, for example, lithium borohydride, sodium borohydride, potassiuum borohydride, or sodium trimethoxy borohydride.

In the production of the compound of formula (I), the alkali metal borohydride is used in an amount of, for example, 0.8 to 20 mols, preferably 1 to 3 mols per mol of the compound of formula (II), and the reaction is carried out in a solvent. It is advantageous to carry out the reaction in the presence of a metal halogenide, such as calcium chloride, magnesium bromide, lithium chloride, lithium bromide or lithium iodide. When R in formula (II) is an alkoxy group, water or a $C_1$ – $C_5$ aliphatic alcohol such as methanol, ethanol, propanol or amyl alcohol can be used as the solvent. The use of $C_1$ – $C_3$ alcohols is preferred.

When R is a halogen atom in formula (II), ordinary inert solvents such as benzene, ethyl ether, dioxane or tetrahydrofuran or mixtures thereof can be used as the solvent. When R is a halogen atom, it is sufficient that the alkali metal borohydride is used in an amount of about 1 to 5 mols per mol of the phthalazine derivative. The reaction can be carried out usually at 0° to 250°C., preferably 0° to 200°C., more preferably 0° to 100°C. When R in formula (II) is an alkoxy group, it is preferred that the reaction be carried out at 0° to 100°C. Usually, the reaction ends in 0.5 to 3 hours, but the reaction may also be carried out at low temperatures for long periods of time. The product can be easily isolated, and purified.

According to this invention, there are provided pharmaceutical compositions comprising an effective amount of the compound of the formula

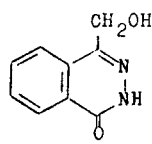

or a pharmaceutically acceptable acid addition salt thereof, and a diluent.

This composition has outstanding pharmaceutical effects especially for the treatment of hemorrhage, thrombosis and atherosclerosis. Such thrombosis include, for example, cerebral thrombosis, coronary thrombosis and peripheral thrombosis. Examples of the atherosclerosis include cerebral atherosclerosis, coronary atherosclerosis, arteriosclerosis oblitrance, thromboangitis oblitrance, thromphlebitis, angiopathy of diabetes mellitus, or nephropathy of diabetes mellitus.

The effective amount of the compound of formula (I) can be freely changed according to a particular dose intended, but usually is about 0.1 to 80 percent based on the combined amount of the diluent and the compound of formula (I). In short, it may be any desired concentration required for administration in a dose of 1 to 100 mg/Kg body weight/day.

The diluent may be a liquid or solid, and the term diluent is used in this invention to denote also adjuvants. Examples of the liquid diluent include distilled water for injection, isotonic sodium chloride solution, Ringer's solution, Locke's solution, polyethylene glycol, ethyl alcohol, propylene glycol, glycerol, liquid paraffin, and vegetable oil. The solid diluent includes, for example, sodium chloride, glucose, polyvinyl pyrrolidone, lactose, starch, methyl cellulose, sucrose, polyethylene glycol, white vaseline, cetyl alcohol, cacao butter and spermaceti.

The composition of this invention can be used in various forms such as injection, infusion, powder, tablet, granule, capsule, troche, solution, elixir, suspension, spirit, syrup, limonad, ointment, eye drop and suppository.

The composition of this invention can be administered by various means, for example, parenteral administration such as injection including intravenous injection, intra-arterial injection, intracutaneous injection and infusion, coating, eye dropping and insertion, and oral administration.

The invention will now be described further by the following Examples.

EXAMPLE 1

To a solution of NaBH$_4$ in ethanol which was prepared by dissolving 19g NaBH$_4$ in 120 ml ethanol at 0°–10°C., was added 12g 4-ethoxycarbonyl-1-keto-1,2-dihydrophthalazine 12g at 0°–10°C. with stirring. To the suspension so obtained, was added a solution of 3g calcium chloride in 36 ml ethanol, and then the reaction mixture was stirred further for 5 hours at room temperture. The ethanol was distilled off under reduced pressure, and the residue was dissolved in water. The solution was adjusted to pH 6–7 with acetic acid and dried under reduced pressure. The residue was extracted continuously with chloroform using a Soxlet-apparatus. The chloroform extract was distilled off, and the residue was recrystallized from methanol to yield 4-hydroxymethyl-1-keto-1,2-dihydrophthalazine melting at 206°–208°C. The yield of the product was 8.6g (90%).

UV spectrum: $\lambda_{max}$EtOH, 225 m$\mu$($\epsilon$32 16,100), 245 m$\mu$($\epsilon$=7,700), 253 m$\mu$($\epsilon$=8,200) 281 m$\mu$($\epsilon$=6,400), 300 m$\mu$($\epsilon$=4,500), 312 m$\mu$($\epsilon$=2,800).

EXAMPLE 2

A mixture of 3g 4-carboxy-1-keto-1,2-dihydrophthalazine 3 g and 40 ml thionyl chloride was refluxed gently at 70°–80°C. for 1 hour on a water bath. The excess of thionyl chloride was then distilled off, and the residue was dissolved in 30 ml dioxane. To the dioxane solution, was added portionwise 2g sodium borohydride at 0°–10°C. with stirring. The reaction mixture was stirred further for 1 hour, and then the solvent was distilled off. The residue was recrystallized from water to yield 4-hydroxymethyl-1-keto-1,2-dihydrophthalazine 1.2g melting at 201°–202°C.

EXAMPLE 3

Examples of pharmaceutical formulations are as follows :

Injection and infusion:
  compound B 1g, sodium chloride 0.9g, and distilled water for injection 100 ml.
  compound B 1g, glucose 5g, and distilled water for injection 100ml.
  compound B 1g, polyvinylpyrroridone 10g, and distilled water for injection 90ml.
  compound B 1g, propyleneglycol 20ml., and distilled water for injection 80ml.
Powder: compound A 1g and lactose 1g; compound A 10g and lactose 90g; compound A 1g and lactose 99g; compound A 1g and starch 99g; compound A 1g and lactose or starch or their mixture 98.99 and yellow dye 0.01g.
Tablet: compound A 50mg., lactose 100g, starch 43mg, methyl cellulose 5mg, and magnesium stearate 2mg.
Granular: compound A 25%, lactose 50%, starch 22.5% and methyl cellulose 2.5%
Capsule: compound A 50mg, glucose 100mg, starch 48mg, magnesium stearate 1mg, and talc 1mg; compound A 50mg, and vegetable oil 50mg.
Troche: compound A 50mg, sucrose 898mg, magnesium stearate 50mg, and yellow dye 2mg.
Solution: compound B 10% and purified water 90%.
Elixir: compound B 10g, ethanol 10ml, glycerin 20ml, sucrose 35g, and purified water 30ml.

Suspension: compound A 10g, sodium methyl cellulose carboxylate 1g, yellow dye 0.02 and purified water 90ml.

Spirit: compound A 10%, purified water 10% and ethanol 80%.

Syrup: compound B 10g, sucrose 50g, ethanol 2ml, and purified water 40ml.

Limonad: compound B 10g, citric acid 0.3g nucrose 5g, and purified water 85ml.

Ointment: compound A 1%, white vaselin 94%, and liquid paraffine 5%; compound A 1g, white vaselin 39g, cetyl alcohol clohol 18g, sesquioleic acid sorbitate 5g, lauromagrogol 0.5g, boric acid 0.2g, and purified water 40ml. compound A 1g, polyethyleneglycol-400 54g, polyethyleneglycol-4,000 45g Eye drop: compound B 1g, isotonic agent (boric acid or sodium chloride) suitable amount, and distilled water 100ml.

suppository: compound A 0.1g, cacao butter 1.6g, spermaceti 0.3g. compound A 0.1g, polyethyleneglycol-4000 0.3g, and polyethylene-glycol-15000 1.6g ("Compound A" and "Compound B" in the above formulation mean 4-hydroxymethyl-1-keto1,2-dihydrophthalazine and 4-hydroxymethyl-1-keto-1,2-dihydrophthalazine hydrochloride, respectively.)

EXAMPLE 4

Effect of 4-hydroxymethyl-1-keto-1,2-dihydrophthalazine for the prevention of experimental atheroselerosis 4-hydroxymethyl-1-keto-1,2-dihydrophthalazine showed a profound effect for the prevention of atherosclerosis, inhibiting cholesterol deposition on arterial wall in the experimental atherosclerosis. The experimental results are shown below.

Ninety-five healthy male rabbits were each fed 150 g. per day of pellets containing 1% cholesterol for 15 weeks. Thereafter 5 rabbits from the above treated group were sacrificed. The remaining 90 rabbits were divided into six groups. While all of the groups were fed with standardized food, five groups were each administered with 10 mg. per kg. of 4-hydroxymethyl-1-keto-1,2-dihydrophthalazine, the remaining one group with placebo consisting of potato starch. After 6, 10 and 20 weeks, each 5 rabbits of the six groups were sacrificed, and the total contents of cholesterol in the arterial wall were estimated by gas chromatography. The results are shown below in Table 1.

1. The total-cholesterol content at the end of the first 15 weeks was 40.6 – 12.1 μg/mg dry weight.
2. The total-cholesterol contents of the six groups are indicated in the following table. The contents were shown in μg unit per one mg. of the dried arterial wall. The values shown below are the average one of each 5 rabbits.

Table 1

| Group administered with | Period (week) | Cholesterol Content (μg) |
| --- | --- | --- |
| placebo | 6 | 29.3 ± 1.6 |
| | 10 | 31.7 ± 2.5 |
| | 20 | 24.91 ± 8.1 |
| placebo | 6 | 30.6 ± 2.4 |
| | 10 | 21.2 ± 2.3 |
| | 20 | 23.8 ± 6.2 |
| 2,6-bis(hydroxymethyl)- | | |

Table 1-Continued

| Group administered with | Period (week) | Cholesterol Content (μg) |
| --- | --- | --- |
| pyridine-di-N-methylcarbamate (pyridinolcarbamate) | 6 | 26.0 ± 5.6 |
| | 10 | 17.8 ± 2.3 |
| | 20 | 10.6 ± 2.4 |
| pyridinolcarbamate | 6 | 27.3 ± 2.6 |
| | 10 | 16.0 ± 2.6 |
| | 20 | 9.8 ± 2.4 |
| 4-hydroxymethyl-1,2-dihydro-phthalazine | 6 | 28.1 ± 3.4 |
| | 10 | 13.2 ± 2.1 |
| | 20 | 6.3 ± 2.5 |
| 4-hydroxymethyl-1,2-dihydro-phthalazine | 6 | 26.5 ± 4.1 |
| | 10 | 12.2 ± 2.2 |
| | 20 | 6.7 ± 2.0 |

EXAMPLE 5

4-hydroxymethyl-1-keto-1,2-dihydrophthalazine showed a preventive effect for the enhancement of coagulability and thrombogenicity by one shot treatment of animal with cholesterol or adrenaline.

After oral administration of 10 mg/kg of the compound of the present invention to a rabbit, intensity of platelet aggregation induced by adenisine diphosphate was measured by Born's method (Born, J. Physiol. 162, 67 (1962), see also O'Brien, J. Clin. Path. 15, 452 (1962), Lancet, 1, 779 (1968).

A rabbit was injected with adrenaline (1 μg/kg) 3 hours after oral administration of the sample. Five minutes after the injection, 4.5 ml of blood was taken from the carotid artery and then diluted with 0.5 ml of 3.8 % solution of sodium citrate. After centrifugation of the blood at 1000g. for 30 minutes, aliquots each of 0.9 ml were taken from the supernatant. To the aliquots were added each 0.1 ml of $3 \times 10^{-5}$ molar and $10^{-4}$ molar solutions of adenosine diphosphate. Therefore the molar concentrations of ADP in the serum were $3 \times 10^{-6}$ and $10^{-5}$ respectively. The intensity of platelet aggregation was measured using a platelet aggregation meter (Model 169, Evans Elect. Ltd. England). Intensities of the ADP-induced platelet aggregation were shown as percentage of the pre-injection value. As shown in Table 2, the compound of this invention showed lower values of the ADP-induced platelet aggregation, thus preventing enhancement of coagulability and thrombogenicity.

Table 2

| Compound | The enhancement of intensity of ADP-induced platelet aggregation | |
| --- | --- | --- |
| | $3 \times 10^{-6}$ M | $10^{-5}$ M |
| saline (control) | 121.8 ± 7.8 % | 115.1 ± 4.9% |
| dibenzyline (control) | 101.7 ± 8.7% | 106.7 ± 7.3% |
| pyridinolcarbamate (control) | 109.0 ± 5.9% | 100.8 ± 6.5% |
| aspirin (control) | 106.0 ± 3.0% | 111.5 ± 2.6% |
| 4-hydroxymethyl-1-keto-1,2-dihydrophthalazine hydrochloride | 86.4 ± 2.1% | 78.2 ± 3.5% |

EXAMPLE 6

The effect of the compound of the present invention on the clinical course and relapse rate of patients aftr their apopletic attack of cerebral hemorrhage or cerebral thrombosis was estimated in a controlled study.

Fifty-six patients admitted within 30 days after the stroke were subjected to the study. They were uniformly divided into A group (a control group) and B group (a group treated with the compound of the present invention) at their admission and also matched to sex, age, symptoms and so on. As shown in Table 3, there were 27 patients in the A group and 29 patients in the B group: there were nine patients with hemorrhages and 18 with thrombosis in the A group and nine were patients with hemorrhages and 20 with thrombosis in the B group. There were no significant differences between the two groups with respect to sex, age, symptoms, complications, early history, onset of observation and period of observation. The diagnosis was made mainly according to the criterion of Dr. Milikan et al.

One gram of the compound of the present invention was administered orally to the B group daily. All other medical treatment was identical in the two groups. The clinical effect of the compound on the disturbance of consciousness, speech and motor function was studied. The degree of impairment of each symptom was assessed in each patient at admission and 10 days later. Five assessment grades were used ranging from no disability to totally disabled. A distinct improvement of one grade or even an improvement in the same grade in any one of three symptoms during this 10 day period was defined as clinical improvement.

Table 3

|  | Group A | Group B |
| --- | --- | --- |
| Number of cases: | 27 | 29 |
| Hemorrhage | 9 | 9 |
| Thrombosis | 18 | 20 |
| Sex: |  |  |
| Male | 21 | 23 |
| Female | 6 | 6 |
| Age: | 38–86 years | 37–86 years |
| Symptom: |  |  |
| Disturbance of |  |  |

Table 3 — Continued

|  | Group A | Group B |
| --- | --- | --- |
| Consciousness (cima) | 10 (2) | 13 (1) |
| Speech (aphasis) | 21 (3) | 22 (3) |
| Motor function (hemiplegia) | 27 (10) | 29 (9) |
| Complications: |  |  |
| Hypertension | 17 | 15 |
| Diabetes Mellitus | 1 | 2 |
| Hypercholesterolemia | 7 | 5 |
| Abnormal ECG | 9 | 11 |
| Early history: |  |  |
| Apoplexy | 4 | 3 |
| Arteriosclerotic diseases | 7 | 5 |
| Hypertension | 13 | 15 |
| Onset of observation: | 8.7 1.6 days | 9.7 1.6 days |
| Period of observation: | 8 days-6 months | 8 days-6 months |

In the A group, 15 of 27 cases or 55.6% showed clinical improvement. On the other hand, in the B group clinical improvement was observed in 25 of 29 cases or 86.2%. This difference is statistically significant at the 5% level.

What is claimed is:

1. A method of treating cerebral thrombosis which comprises administering to a human patient suffering therefrom an effective amount of the compound of the following formula

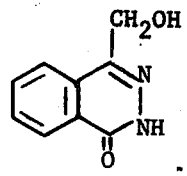

or a pharmaceutically acceptable inorganic acid salt thereof in a dose of 1 to 100 mg/kg body weight/day.

2. The method of claim 1 wherein said administration is performed by parenteral administration, intravenous injection, intra-arterial injection, intracutaneous injection, or infusion.

* * * * *